(12) United States Patent
Weston et al.

(10) Patent No.: US 10,489,701 B2
(45) Date of Patent: Nov. 26, 2019

(54) GENERATING RESPONSES USING MEMORY NETWORKS

(71) Applicant: Facebook, Inc., Menlo Park, CA (US)

(72) Inventors: Jason E. Weston, New York, NY (US); Sumit Chopra, Jersey City, NJ (US); Antoine Bordes, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 689 days.

(21) Appl. No.: 14/881,352

(22) Filed: Oct. 13, 2015

(65) Prior Publication Data

US 2017/0103324 A1    Apr. 13, 2017

(51) Int. Cl.
*G06N 3/04*    (2006.01)
*G06N 5/02*    (2006.01)
*G06F 16/28*    (2019.01)
*G06F 16/2457*    (2019.01)

(52) U.S. Cl.
CPC ......... *G06N 3/04* (2013.01); *G06F 16/24578* (2019.01); *G06F 16/285* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,221,809 B2 * | 5/2007 | Geng | ................ | G06K 9/00201 |
| | | | | 382/280 |
| 8,866,931 B2 * | 10/2014 | Yoon | .................. | H04N 5/23219 |
| | | | | 348/222.1 |
| 10,095,917 B2 * | 10/2018 | Taigman | ............ | G06K 9/00268 |
| 10,410,119 B2 * | 9/2019 | Grefenstette | .......... | G06N 3/082 |
| 2016/0117586 A1 * | 4/2016 | Graves | .................... | G06N 3/08 |
| | | | | 706/25 |
| 2017/0200077 A1 | 7/2017 | Weston et al. | | |

OTHER PUBLICATIONS

Graves, Alex et al.; Neural Turing Machines; arXiv:1410.5401v2 [cs.NE] Dec. 10, 2014; pp. 1-26. (Year: 2014).*
U.S. Appl. No. 15/472,086 by Weston, J., et al., filed Mar. 28, 2017.

\* cited by examiner

*Primary Examiner* — Stanley K. Hill
(74) *Attorney, Agent, or Firm* — Baker Botts L.L.P.

(57) ABSTRACT

Embodiments are disclosed for providing a machine-generated response (e.g., answer) to an input (e.g., question) based on long-term memory information. A method according to some embodiments include receiving an input; converting the input into an input feature vector in an internal feature representation space; updating a memory data structure by incorporating the input feature vector into the memory data structure; generating an output feature vector in the internal feature representation space, based on the updated memory data structure and the input feature vector; converting the output feature vector into an output object; and providing an output based on the output object as a response to the input.

30 Claims, 12 Drawing Sheets

Joe went to the kitchen. Fred went to the kitchen. Joe picked up the milk.
Joe travelled to the office. Joe left the milk. Joe went to the bathroom.
Where is the milk now? A: office
Where is Joe? A: bathroom
Where was Joe before the office? A: kitchen

*FIG. 5*

Joe went to the garden then Fred picked up the milk; Joe moved to the bathroom and Fred dropped the milk, and then Dan moved to the living_room.
Where is Dan? A: living room I believe
Where is Joe? A: the bathroom
Fred moved to the bedroom and Joe went to the kitchen then Joe took the milk there and Dan journeyed to the bedroom; Joe discarded the milk.
Where is the milk now ? A: the milk is in the kitchen
Where is Dan now? A: I think he is in the bedroom
Joe took the milk there, after that Mike travelled to the office, then Joe went to the living_room, next Dan went back to the kitchen and Joe travelled to the office.
Where is Joe now? A: I think Joe is in the office

*FIG. 6*

Bilbo travelled to the cave. Gollum dropped the ring there. Bilbo took the ring.
Bilbo went back to the Shire. Bilbo left the ring there. Frodo got the ring.
Frodo journeyed to Mount-Doom. Frodo dropped the ring there. Sauron died.
Frodo went back to the Shire. Bilbo travelled to the Grey-havens. The End.
Where is the ring? A: Mount-Doom
Where is Bilbo now? A: Grey-havens
Where is Frodo now? A: Shire

*FIG. 7*

Fred went to the kitchen. Fred picked up the milk. Fred travelled to the office.
Where is the milk ? A: office
Where does milk come from ? A: milk come from cow
What is a cow a type of ? A: cow be female of cattle
Where are cattle found ? A: cattle farm become widespread in brazil
What does milk taste like ? A: milk taste like milk
What does milk go well with ? A: milk go with coffee
Where was Fred before the office ? A: kitchen

*FIG. 8*

GENERATING RESPONSES USING MEMORY NETWORKS

BACKGROUND

Automatic question answering (QA) is a form of information retrieval in which focused answers are generated for either user queries, e.g., a key word search, or ad hoc questions, e.g., questions in a natural language format. A question answering system can attempt to handle various question types including: fact, list, definition, how, why, hypothetical, semantically constrained, and cross-lingual questions. The questions can be either in a closed domain or open domain. Closed-domain questions are under a specific knowledge domain (e.g., medicine or physics). Open-domain questions can relate to any topics and usually rely on general knowledge for answers. Question answering is regarded as requiring more complex natural language processing (NLP) techniques than other types of information retrieval such as document retrieval.

BRIEF DESCRIPTION OF THE DRAWINGS

FIG. 5 is an illustration of an example task performed by the memory network.

FIGS. 6-8 are illustrations of various example tasks performed by the memory network.

DETAILED DESCRIPTION

The disclosed embodiments use a learning model called memory network to analyze long-term knowledge base and to generate a textual response as a response to an input. The memory network model first converts an incoming input (e.g., an input sentence) into a feature vector according to an internal feature representation. The input can include, e.g., a character, a word, a text, a sentence, an image, an audio, a video, a user interface instruction, a computer-generated action, etc. The dimension of the feature representation can be, e.g., dependent upon the representation chose as basis. For example, the basis can be a group of words (also referred to as "bag of words" or "dictionary"). The memory network model further updates the memories by storing the feature vector in a memory slot. The model can forget some memory slots to save space by monitoring the utility status of the memory slots. The memory slots can be further hashed or clustered to improve lookup efficiency.

The memory network model determines one or more supporting memory vectors that are most relevant to the input feature vector among the stored memory slots. The relevancy is evaluated using matching functions whose matrix elements are trained by a fully supervised data set including questions and desired responses. The memory network model generates an output feature vector based on the input feature vector and the one or more supporting memory vectors. The model can further take into account the time when a memory slot is written in order to respond to the input relevant to time. Then the memory network model decodes the output feature vector into a final response to the input. The response can include, e.g., a character, a word, a text, a sentence, an image, an audio, a video, a user interface instruction, a computer-generated action, etc. In various embodiments, the input and the response can be in a form of a question and an answer.

Figure 1:
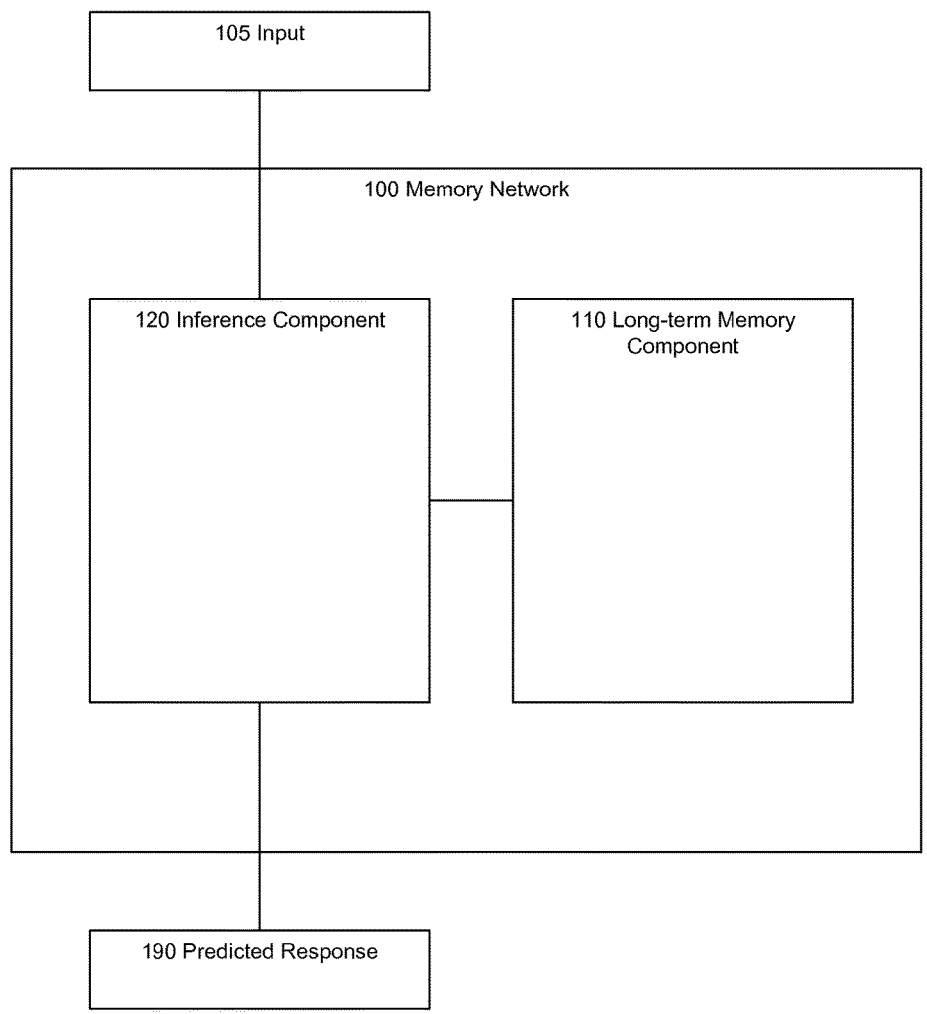
FIG. 1 is a block diagram illustrating a memory network for providing machine-generated responses.

Turning now to the Figures, FIG. 1 is a block diagram illustrating a memory network for providing machine-generated responses (e.g., answers), consistent with various embodiments. A memory network 100 is an artificial neural network integrated with a long-term memory component. The memory network 100 conducts logic reasoning using its inference component 120 combined with the long-term memory component 110 (also referred to as "memory component"). Over a training process, the memory network 100 learns how to effectively operate the inference component 120 and the memory component 110 jointly. The memory network 100 can read data from the memory component 110 as well as write data to the memory component 110.

The memory network 100 can provide a prediction based on inputs, particularly to provide a predicted response 190 (also referred to as a "machine-generated response") to an input 105 (e.g., question or inquiry). The long-term memory component 110 acts as a knowledge base for the memory network 100 to make a predicted response (e.g., answer). The knowledge base is dynamic, meaning that the memory network 100 continues to update the long-term memory component 110 using additional inputs, e.g., over time. In some embodiments, the output of the memory network 100 (e.g., the predicted answer) is a textual response. In some embodiments, the output of the memory network 100 can have various forms, such as images, audios, videos, computer-generated actions, user graphic interface elements, etc.

In some embodiments, the memory network 100 has a reasoning capability to chain multiple supporting sources (e.g., text, documents, databases, etc.) together to answer questions that require understanding the intent of verbs in the knowledge contained in the long-term memory component 110.

Figure 2:
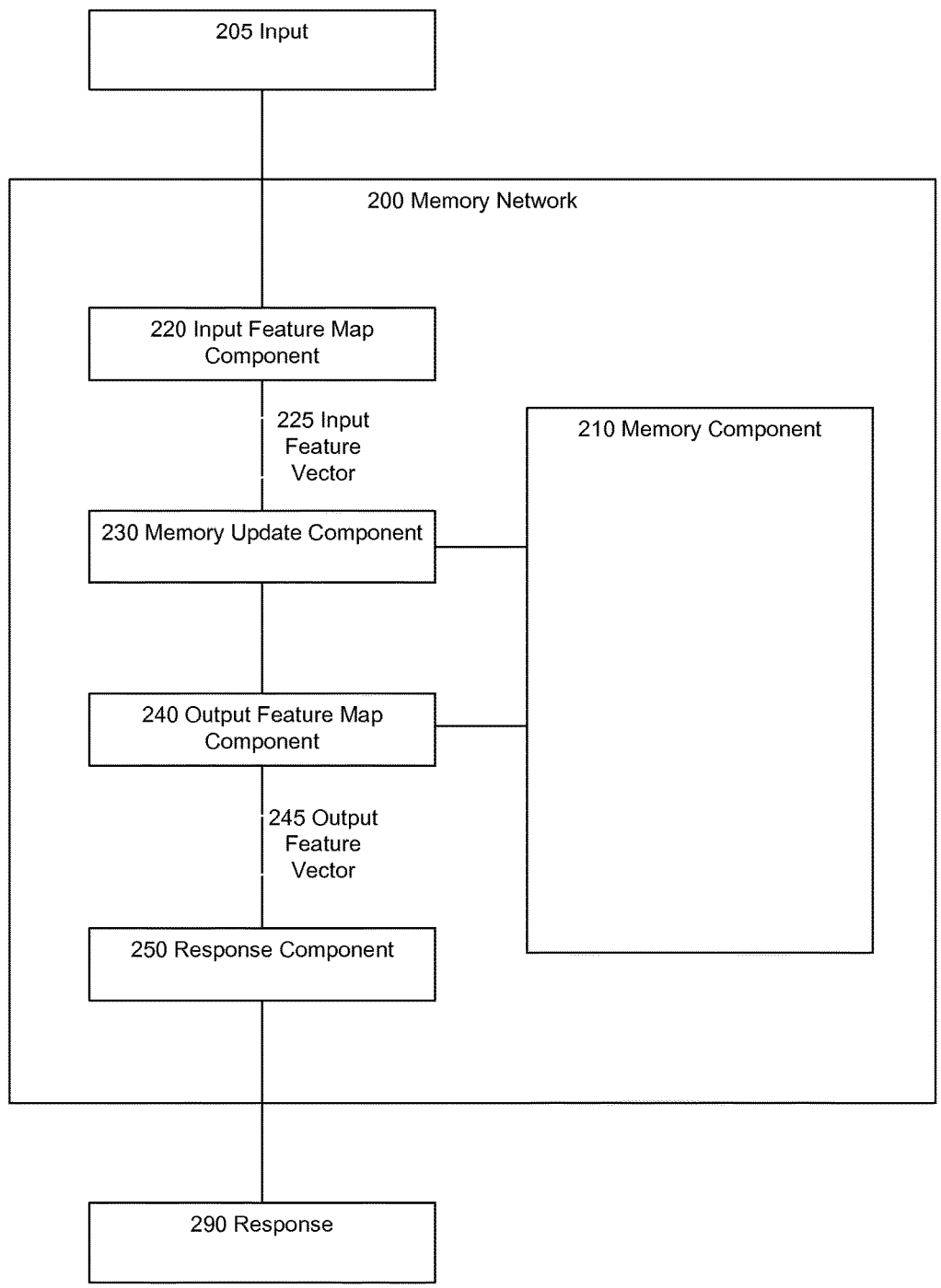
FIG. 2 is a block diagram illustrating data flows between a memory component and various inference components within a memory network.

FIG. 2 is a block diagram illustrating data flows between a memory component and various inference components within a memory network, consistent with various embodiments. The memory network 200 includes a memory component 210 and four inference components: an input feature map component 220, a memory update component 230, an output feature map component 240 and a response component 250. The memory component 210 (noted as m) includes an array of objects (noted as $m_i$, with the index i being the sequence numbers of objects).

The memory network 200 can receive an incoming input 205 (noted as x), e.g., in form of a character, a word, a sentence, an image, an audio, a video, etc. The input feature map component 220 can convert the incoming input 205 into an input feature vector 225 in an internal feature representation space, noted as I(x). The input feature vector 225 can be a sparse or dense feature vector, depending on the choice of the internal feature representation space. For textual inputs, the input feature map component 220 can further perform preprocessing (e.g., parsing, co-reference and entity resolution) on the textual inputs.

Using the input feature vector 225, the memory update component 230 can update the memory component 210 by, e.g., compressing and generalizing the memory component 210 for some intended future use:

$$m_i = G(m_i, I(x), m), \forall i.$$

Based on the current state of the memory component 210 and the input feature vector 225, the output feature map component 240 can generate an output feature vector 245 in the internal feature representation space, noted as o:

$$o = O = (I(x), m).$$

During the process, the output feature map component 240 receives the input feature vector 225 and scans the memory component 210 to find relevant memory information that relates to the input feature vector 225. The output feature map component 240 then further performs inference to generate the output feature vector 245 based on the relevant memory information.

The response component 250 converts (e.g., decodes) the output feature vector 245 into a response 290 of a desired response format, e.g., a textual response or an action: r=R(o).

In other words, the response component 250 produces the actual wording of the answer. In various embodiments, the response component 250 can include, e.g., a recurrent neural network (RNN) that is conditioned on the output of the output feature map component 240 to produce a sentence as the response 290.

The data flows as illustrated in FIG. 2 happen in both the training phase and the production phase of the memory network 200. However, there is at least one distinction between the training phase and the production phase. During the training phase, pairs of training inputs and responses are used to train the model parameters of input feature map component 220, memory update component 230, output feature map component 240 and response component 250, noted as I, G, O and R, respectively. In other words, for each desired training input, the desired response is known. The parameters of components I, G, O and R are optimized during the training phase to output the desired responses. In contrast, during the production phase, the parameters of components I, G, O and R are fixed and not updated.

In various embodiments, the memory update component 230 can update the memory component 210 in different ways. For example, the memory update component 230 can add the input feature vector 225 into the memory component 210 as an extra "memory slot" without changing the rest of the memory component 210.

Figure 3:
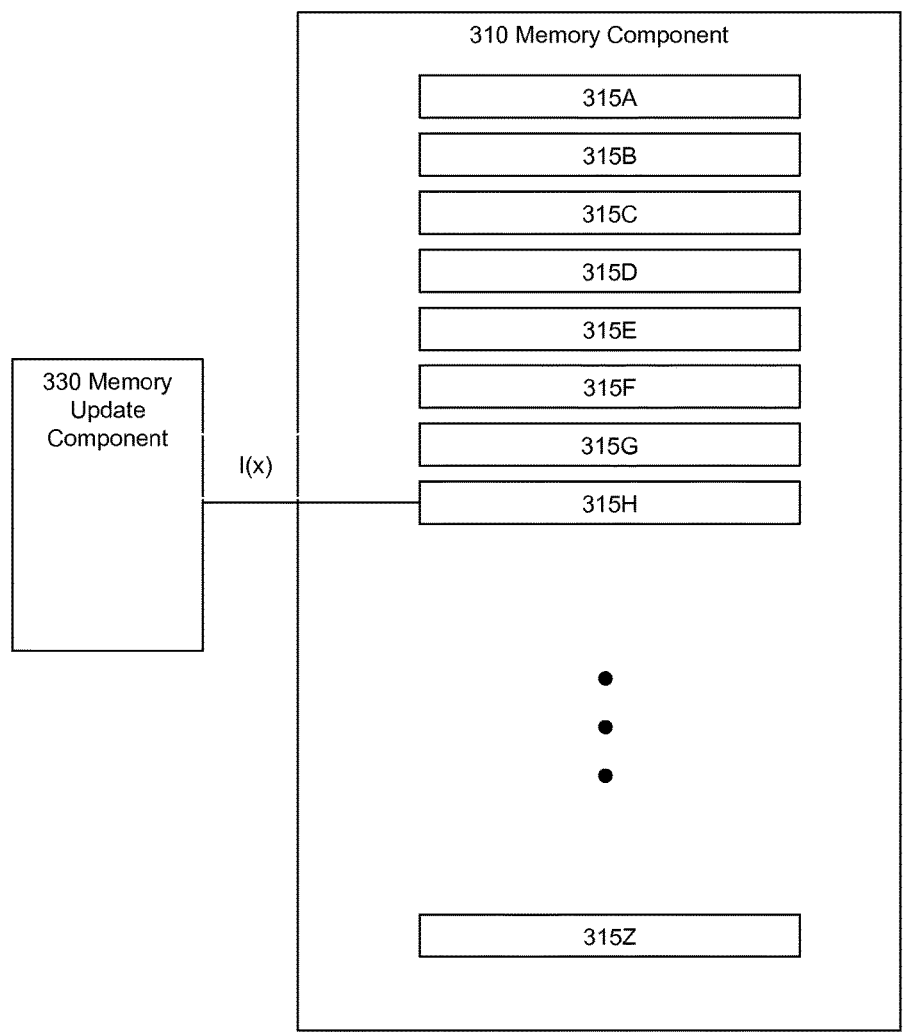
FIG. 3 is a block diagram illustrating a memory component being organized as a combination of memory slots.

FIG. 3 is a block diagram illustrating a memory component being organized as a combination of memory slots, consistent with various embodiments. The memory component 310 (noted as m) includes an array of objects (noted as $m_i$) being organized as a group of memory slots 315A-315Z. The memory update component 330 stores the input feature vector I(x) in a memory slot 315H in the memory component 310:

$$m_{H(x)} = I(x).$$

The H function is a slot-choosing function that selects the memory slot for storing the input feature vector. The memory update component 330 updates the index H of memory component m, wherein the index specifies the total number of memory slots that contain data for the memory component m. Other parts of the memory component 310 (e.g., memory slots 315A-315Z) remain unchanged.

In various embodiments, the memory update component 330 can go back and update some or all of earlier stored memory (e.g., memory slots 315A-315Z) based on new information from the new input x. If the input is at the character or word level, the memory update component 330 can segment the input into chunks and store each chunk in a memory slot.

The slot-choosing function H can further organize the memory slots of the memory component. Particularly for a memory component having a large number of memory slots, the slot-choosing function H can be trained to store memories by entity or topic. Consequently, for efficiency at scale, the memory update component and output feature map component need not operate on all memory slots. These components can operate on only a subset of relevant candidates (e.g., only operating on memory slots that relate to a particular topic).

In various embodiments, the memory component 310 can further erase or replace memory slots (also referred to as "forget"), if the memory component 310 is full. The memory component 310 is full when all allocated memory slots of the memory component 310 have stored actual memory data and no memory slot is available for new memory data. For example, the slot-choosing function H can conduct the "forget" process, by scoring the utility history of each memory slot, and overwriting the memory slot that has been used for the least number of times.

Figure 4:
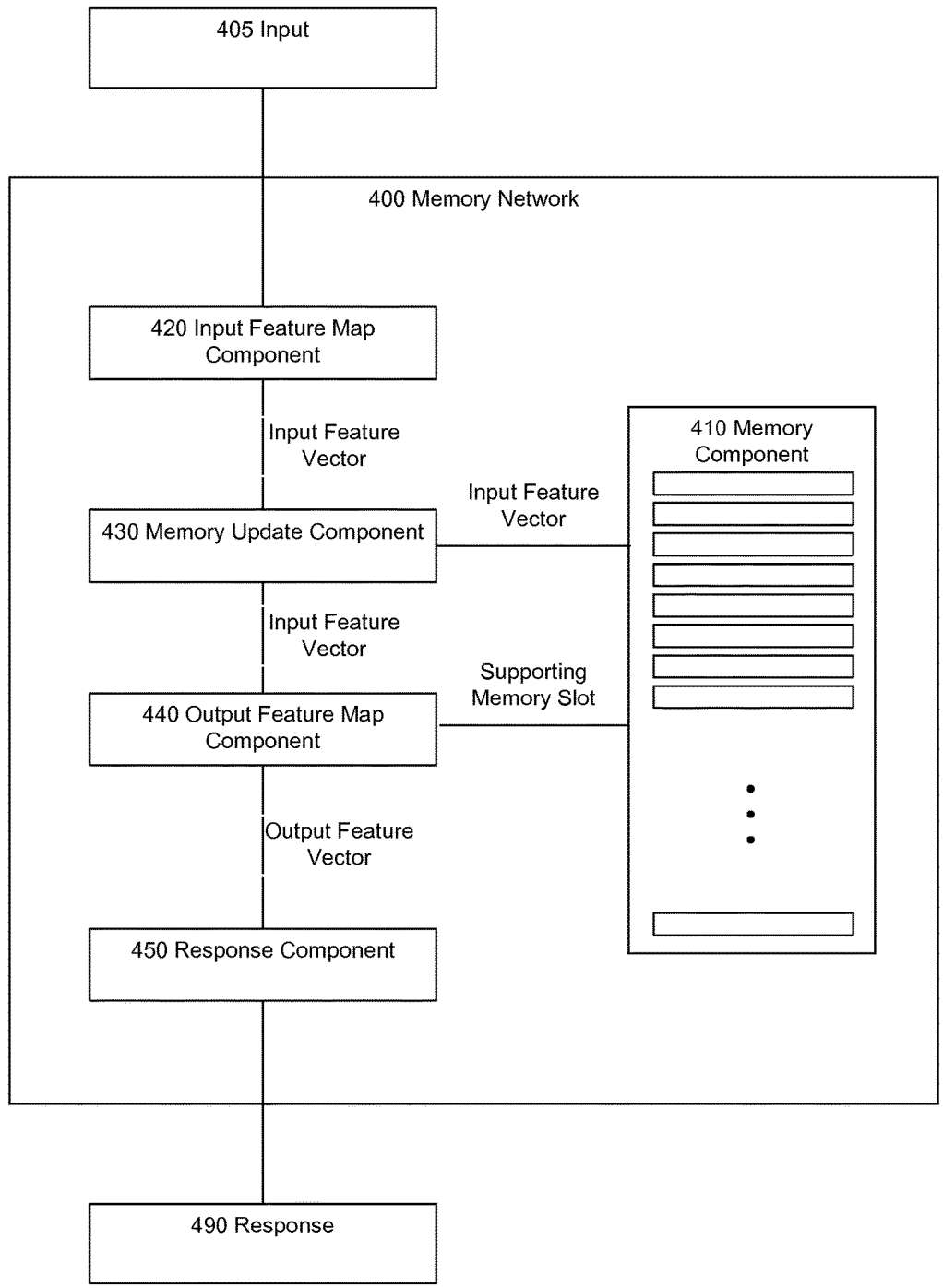
FIG. 4 is a block diagram illustrating a memory network for generating an output as a response to an input.

FIG. 4 is a block diagram illustrating a memory network for generating an output as a response to an input, consistent with various embodiments. The input feature map component 420 of the memory network 400 receives an input 405. The input 405 can be, e.g., a question or inquiry about a fact in a textual form (e.g., a sentence). The input feature map component 420 converts the input 405 into an input feature vector x.

The slot-choosing function returns the next empty memory slot N:

$$m_N = x, N = N+1.$$

The memory update component 430 stores the input feature vector x into the next empty memory slot. In the illustrated embodiment, the memory update component 430 only stores the input feature vector in a new memory slot and does not update any existing memory slots of the memory component 410. However, in various embodiments, the memory update component 430 can update the memory slots in more sophisticated ways.

The output feature map component 440 and the response component 450 are responsible for handling the major part of the inference. The output feature map component 440 produces the output feature vector by first finding multiple (k number of) supporting memory slots that relate to input feature vector x. In the illustrated embodiment, two supporting memory slots are used (thus, k=2). However, in various embodiments, the output feature map component can use any integer number of supporting memory slots, including one.

The output feature map component 440 retrieves a highest scoring supporting memory slot $o_1$:

$$o_1 = O_1(x, m) = \underset{i=1,\ldots,N}{\arg\max}\, s_O(x, m_i).$$

Function $S_O$ is a scoring function that scores the relevancy between the pair of the input feature vector x and a memory slot $m_i$. The output feature map component 440 computes the relevancy scores between the input feature vector x and each memory slot using the scoring function $S_O$. Then the memory slot having the highest relevancy score is picked as the first supporting memory slot.

For the second supporting memory slot, the output feature map component 440 calculates the relevancy score with respect to both the original input x and the first supporting memory slot:

$$o_2 = O_2(x, m) = \underset{i=1,\ldots,N}{\arg\max}\, s_O([x, m_{o_1}], m_i)$$

The square brackets denote a list of the two vectors. A list of vectors can be, e.g., a vector sum. The output feature map component 440 then generates the output feature vector 445 as $[x, m_{o1}, m_{o2}]$, which is input to the response component 450.

The response component 450 receives output feature vector 445 $[x, m_{o1}, m_{0-2}]$ as input and produces a textual response r (390). In the illustrated embodiment, the response component 450 limits the textual response 490 to be a single word, out of all words known by the memory component 410. However, in various embodiments, the response component 450 can generate a sentence having multiple words based on the same principle. For example, the response component 450 can employ a recurrent neural network (RNN) to generate a response sentence that has multiple words.

The response component 450 calculates relevance scores between the output feature vector 445 and each word in a dictionary of the memory component 410, and picks the word having the highest relevancy score as response 490:

$$r = \arg\max_{w \in W} s_R([x, m_{o1}, m_{o2}], w)$$

wherein W is the set of words in the dictionary and $S_R$ is the relevancy function.

FIG. 5 is an illustration of an example task performed by the memory network, consistent with various embodiments. In order to answer the question x="Where is the milk now?", the output feature map component 440 first computes relevancy scores between the existing memory slots and the input feature vector that corresponds to the question. In the embodiment illustrated in FIG. 5, each memory slot stores a vector corresponding to a sentence of the existing fact sentences. The existing fact sentences form a "memory," which contains the knowledge that is used to perform the inference. The memory slot with the highest relevancy score is selected as the first supporting memory slot and its corresponding fact sentence is selected as the first supporting relevant fact: "Joe left the milk."

In addition, the output feature map component 440 searches the memory again to find a second supporting relevant fact, by computing relevancy scores between the existing memory slots and a list of the input feature vectors and the first supporting memory slot. By ranking the relevancy scores, the output feature map component 440 finds the second supporting relevant fact: "Joe travelled to the office," which discloses the last place Joe went before dropping the milk.

The dictionary of the memory contains the words of the existing fact sentences illustrated in FIG. 5. The response component 450 calculates relevance scores $r = \arg\max_{w \in W} s_R)[x, m_{o1}, m_{o2}], w)$ between the output feature vector (corresponding to the input sentence and two supporting relevant facts) and each word in a dictionary, and picks the word having the highest relevancy score: r="office."

In the embodiment illustrated in FIGS. 4 and 5, the relevancy scoring functions $S_O$ and $S_R$ can have the same form:

$$s(x,y) = \Phi_x(x)^T U^T U \Phi_y(y).$$

U (referred to as "embedding matrix" or "weight matrix") is a n×D matrix, where D is the number of features and n is an embedding dimension. The embedding dimension can be chosen based on a balance between computational cost and model accuracy. The mapping functions $\Phi_x$ and $\Phi_y$ map the original input text to an input feature vector in a D-dimensional feature space. The D-dimensional feature space can be, e.g., based on an ensemble of words that appear in the existing memory.

For the relevancy scoring function $S_O$, the memory network can choose the dimension D=3|W|. In other words, every word in the dictionary has three different representations: one for mapping function $\phi_x$ and two for mapping function $\phi_y$, depending on whether the words of the input of the function are from the actual input x or from the supporting memories so that they can be modeled differently.

Similarly, for the relevancy scoring function $S_R$, the memory network can also choose the dimension D=3|W|. The relevancy scoring functions $S_O$ and $S_R$ can use different weight matrices $U_O$ and $U_R$. In various embodiments, the relevancy scoring functions $S_O$ and $S_R$ can have different forms that are different from the embodiment illustrated here.

In order to determine the parameters of the relevancy scoring functions $S_O$ and $S_R$ (e.g., elements of the weight matrices $U_O$ and $U_R$), the memory network is trained in a supervised setting. The memory network is trained using inputs with known responses. In the training data, the sentences of the supporting relevant facts are also labeled as relevant to the corresponding inputs. In other words, during training the best choice of the relevancy scoring functions is known.

The training is performed with a margin raking loss and stochastic gradient descent (SGD). For a given input question x with a corresponding known response r and supporting sentences $m_{o1}$ and $m_{o2}$ (for the case of k=2), the training process minimizes over model parameters (e.g., elements of the weight matrices $U_O$ and $U_R$):

$$\sum_{\bar{f} \neq m_{o_1}} \max(0, \gamma - s_O(x, m_{o_1}) + s_O(x, \bar{f})) +$$

$$\sum_{\bar{f}' \neq m_{o_2}} \max(0, \gamma - s_O([x, m_{o_1}], m_{o_2}) + s_O([x, m_{o_1}], \bar{f}')) +$$

$$\sum_{\bar{r}' \neq r} \max(0, \gamma - s_R([x, m_{o_1}, m_{o_2}], r) + s_R([x, m_{o_1}, m_{o_2}], \bar{r}]))$$

where $\bar{f}$, $\bar{f}'$ and $\bar{r}$ are choices other than the correct labels and $\gamma$ is the margin. At every step of the stochastic gradient descent, the training process samples $\bar{f}$, $\bar{f}'$ and $\bar{r}$ rather than computes the whole sum for each training sample.

In the case that the response component of the memory network employs a recurrent neural network (RNN) to generate the response sentence having multiple words, the last term can be replaced with a log likelihood, and the recurrent neural network is fed with the sequence [x, $o_1$, $o_2$, r]. When the memory network is in production phase, the response component of the memory network outputs the predicted answer based on the output feature vector [x, $o_1$, $o_2$].

Word Sequences as Input

In various embodiments, the memory network can receive input in a form of a stream of words (also referred to as "word sequence") instead of a sentence. Such a stream of words is not segmented or organized as a statement or a question. The memory network can further include a segmentation component for organizing the stream of words into a meaningful statement. The segmentation component takes the word sequence as input and identifies breakpoints of segments within the word sequence. When the segmentation component identifies a segment, the memory update component writes the segment to the memory component.

The segmentation component can be modeled similarly to the output feature map component and response component:

$$\text{seg}(c) = W_{seg}^T U_S \Phi_{segb}(c)$$

where $W_{seg}$ is a vector (effectively including parameters of a linear classifier) and c is the sequence of input words representing a bag of words using a separate dictionary. If $\text{seg}(c) > \gamma$, where $\gamma$ is the margin, the segmentation component recognizes the word sequence as a segment.

In the fully supervised setting, each question in the training set has a corresponding given answer. The input stream can include the question as well as the supporting facts. The segmentation component can be trained using the training set as well, similar to other components. The segmentation component is trained to recognize a meaningful statement within the supporting facts, such as "Bill is in the kitchen" for the question "Where is Bill?" The training criterion for the segmentation component is the minimization of:

$$\sum_{f \in \mathcal{F}} \max(0, \gamma - \text{seg}(f)) + \sum_{\bar{f} \in \bar{\mathcal{F}}} \max(0, \gamma + \text{seg}(\bar{f}))$$

where $\mathcal{F}$ represents the known supporting segments in the labeled training set and $\bar{\mathcal{F}}$ (with a top horizontal line) represents other segments in the training set.

Efficient Memory Via Hashing

If the set of stored memories in the memory component is large, it is prohibitively expensive to compute the relevancy scores for all the memory slots when the output feature map component identifies the one or more supporting memory slots. Instead, the memory network can use a hashing component to speed up the lookup of the memory slots. The hashing component hashes the input feature vector i(x) into one or more buckets, then the output feature map component only computes the relevancy scores for memory slots that are in the same buckets.

The hashing can be conducted via hashing words or via clustering word embedding. For hashing words, the memory component can construct as many buckets as there are words in the dictionary. For a given sentence, the memory network hashes the sentence into all buckets corresponding to words of the sentence. As a result, a memory slot will only be considered if the memory slot shares at least one word with the input sentence.

For clustering word embedding, the memory network takes the trained embedding matrix $U_O$ and runs a vector quantization (e.g., K-means clustering) to cluster word vectors $(U_O)_i$, which gives K buckets. A given input sentence is hashed into the buckets that the individual words of the sentence fall into. As word vectors tend to be close to vectors corresponding to the word's synonyms, these vectors cluster together in a bucket and will be used to compute relevancy scores within the same bucket. Exact word matches between input and memory will still be scored by definition. The choice of K depends on the trade-off between the speed and accuracy.

Modeling Write Time Features

The memory network can further take into account a timestamp when a memory slot was written to the memory component. The timestamp can be useful for generating an answer regarding a status based on a story (e.g., the example illustrated in FIG. 5).

In some embodiments, the representations of the mapping functions $\phi_x$ and $\phi_y$ can have extra features to encode the index j of a given memory $m_j$, assuming that j follows write time and that the memory slots are not rewritten. However, this implementation requires dealing with absolute rather than relative time.

In other embodiments, instead of scoring input, the memory network can use the write time features to recognize when each memory was written. Based on the write times, the memory network comprehends the ordering of the actions in the statements that form a story or dialogue.

The write times may be different from the time information that is described in the texts of the statements. Such time information that is described in the texts of statements can include tense of a statement or time expression in a statement. For example, a statement of "he went to the office yesterday" contains time information itself. For statements containing time information, write time features are not necessary, as the time information can be modeled directly from the textual content.

To include the write time features, the relevancy scoring function $S_O$ is updated to include the three write time features:

$$s_{O_1}(x,y,y') = \Phi_x(x)^T U_{O_1}^T U_{O_1}(\Phi_y(y) - \Phi_y(y') + \Phi_t(x,y,y')).$$

$\Phi_t(x, y, y')$ uses three features that take the value of 0 or 1, depending on whether x is older than y, whether x is older than y', and whether y is older than y'. In other words, the model extends the dimensionality of the mapping function $\phi$ by 3 and sets these three dimensions to zero when not used. If $s_O(x, y, y') > 0$ the model prefers y over y', and if $s_O(x, y, y') \leq 0$ the model prefers y' over y. When selecting supporting memory slots, the arg max function is replaced by a loop over memories: i=1, ..., N. The model keeps the winning memory (y or y') at each step, and compares the current winner to the next memory $m_i$. In other words, at inference time, for a k=2 model, the arg max functions in $$o_1 = O_1(x, m) = \underset{i=1,\ldots,N}{\arg\max}\, s_O(x, m_i) \text{ and}$$

$$o_2 = O_2(x, m) = \underset{i=1,\ldots,N}{\arg\max}\, s_O([x, m_{o_1}], m_i)$$

are placed with $o_1 = O_t(x, m)$ and $o_2 = O_t([x, m_{o_1}], m)$, where $O_t$ is defined in the following algorithm:

Algorithm 1 $O_t$ replacement to arg max when using write time features

```
function O_t(q, m)
    t ← 1
    for i = 2, ..., N do
        if s_{O_t}(q, m_i, m_t) > 0 then
            t ← i
        end if
    end for
    return t
end function
```

The second supporting memory $o_2 = O_t([x, m_{o_1}], m)$ captures the relative age of the first supporting memory with respect to the second supporting memory, based on the determinations on whether $m_{o_1}$ is older than y', and whether y is older than y'. To train the model with time features, the training process minimizes the following terms over model parameters (e.g., elements of the weight matrices $U_O$ and $U_R$):

$$\sum_{\bar{f} \neq m_{o_1}} \max(0, \gamma - s_{O_2}(x, m_{o_1}, \bar{f})) + \sum_{\bar{f} \neq m_{o_1}} \max(0, \gamma + s_{O_2}(x, \bar{f}, m_{o_1})) +$$

$$\sum_{\bar{f}' \neq m_{o_2}} \max(0, \gamma - s_{O_2}([x, m_{o_1}], m_{o_2}, \bar{f}')) +$$

$$\sum_{\bar{f}' \neq m_{o_2}} \max(0, \gamma + s_{O_2}([x, m_{o_1}], \bar{f}' m_{o_2}) +$$

$$\sum_{\bar{r} \neq r} \max(0, \gamma - s_R([x, m_{o_1}, m_{o_2}], r) + s_R([x, m_{o_1}, m_{o_2}], \bar{r}]))$$

where the first four terms include consideration of the time feature triples directly. At every step of stochastic gradient descent (SGD), the system samples $\bar{f}$, $\bar{f}'$, $\bar{r}$ rather than computes the whole sum for each training example.

Modeling Previously Unseen Words

New words that have never appeared in previous literatures (referred to as "unseen words") are continuously introduced. For example, the word "Boromir" first appears in Lord of The Rings by Tolkien in 1954. The memory network can handle the unseen word by predicting a word based on the neighboring words, and assuming that the unseen word has a similar meaning to the predicted word. Such an approach can be incorporated into the relevancy scoring functions $S_O$ and $S_R$.

For each particular word that the memory network encounters, the memory network can store a set of words that have occurred with the particular word as left context of the particular word, and another set of words that have occurred with the particular word as right context of the particular word. An unseen word can be represented with such features. Hence, the feature representation D can be increased from 3|W| to 5|W| to model these contexts (|W| features for each set of words). When the memory network encounters a word that it has never encountered before and does not have an n-dimensional embedding for that word, the memory network represents the word with the context instead.

Exact Matches and Unseen Words

In various embodiments, the embedding models may not efficiently use extracted word matches due to the relatively low dimensionality n. As a solution to it, the memory network adds the "bag of words" matching score to the learned embedding score (with a mixing parameter λ). The memory network scores a pair x, y with:

$$\Phi_x(x)^T U^T U \Phi_y(y) + \lambda \Phi_x(x)^T \Phi_y(y).$$

Alternatively, the memory network can stay in the n-dimensional embedding space, and extend the feature representation D with matching features. For example, one matching feature per word. A matching feature indicates if a word occurs in both x and y; that is, the memory network scores with $\Phi_x(x)^T U^T U \Phi_y(y, x)$ where the mapping function $\Phi_y$ is built conditionally on x. If some of the words in y match the words in x, the memory network sets those matching features to 1. Unseen words can be modeled similarly by using matching features on their context words. This then gives a feature space of D=8|W|.

Simulation Example

One test simulation behaves like a classic text adventure game. Tasks within the simulation can include question answering tasks regarding the locations of people and objects. The task can also include other tasks, e.g., asking the learner to perform actions within the simulation ("Please pick up the milk", "please find John and give him the milk") and asking the learner to describe actions ("What did John just do?").

The actions in the simulation can include, e.g., go <location>, get <object>, get <object 1> from <object 2>, put <object 1> in/on <object 2>, give <object> to <actor>, drop <object>, look, inventory, examine <object>, etc. The simulation can put a set of constraints on those actions. For example, an actor cannot get something that the actor or someone else already has; an actor cannot go to a place where the actor already is; an actor cannot drop something the actor does not already have, etc.

Based on the underlying actions and constraints, a model defines how actors act. In the model, actors try to perform a random valid action (e.g., go, get, or drop). The actions of the actors form a story that is executable by the simulation. One example of a story is illustrated in FIG. 5. The test then asks questions about the state of the simulation, e.g., "Where is milk?", "Where is Joe?", "Where is Joe before he goes to the office?" The memory network generates the answers to these questions based on the knowledge of the underlying story.

The simulation can use automated grammar to produce natural-looking text with lexical variety. Each verb is assigned a set of synonyms. For example, a verb "get" in the simulation can be replaced with either "pick up", "grab", or "take." A verb "drop" in the simulation can be replaced with either "leave", "discard", or "put down." Similarly, each actor or object can have a set of replacement synonyms as well. For the word sequence training setting, the system can join statements into compound sentences. For example, the system can take a set of statements and join them with one of the following connectors: ".", "and", ", then", ";", ", later", ", after that", ", and then", or ", next".

In one test example, the background story (e.g., the memory) includes 4 characters, 3 objects and 5 rooms. The characters are moving around the rooms, picking up and dropping objects. The actions of the characters are transcribed into text using an automated grammar. Labeled questions are generated. In this example, multiple statements need to be used to conduct inference when asking where an object is. Similar to the example in FIG. 5, the memory network needs to understand the meaning of the actions "picked up" and "left" and the influence of the actions' relative order.

FIGS. 6-8 are illustrations of various example tasks performed by the memory network, consistent with various embodiments. In at least one example, the memory network performed on a data set including 14 million statements. The statements are organized as (subject, relation, object) triples and stored in memory slots of the memory component. Examples of the triples are (milne, authored, winnie-the-pooh) and (sheep, be-afraid-of, wolf), etc. The memory network has been trained using pseudo-labeled question-and-answer pairs including a question and an associated triple, and 35 million pairs of paraphrased questions from a website (e.g. WikiAnswers) like "Who wrote the Winnie the Pooh books?" or "Who is pooh's creator?" The machine-generated answers are annotated as right or wrong by humans.

Figure 9:
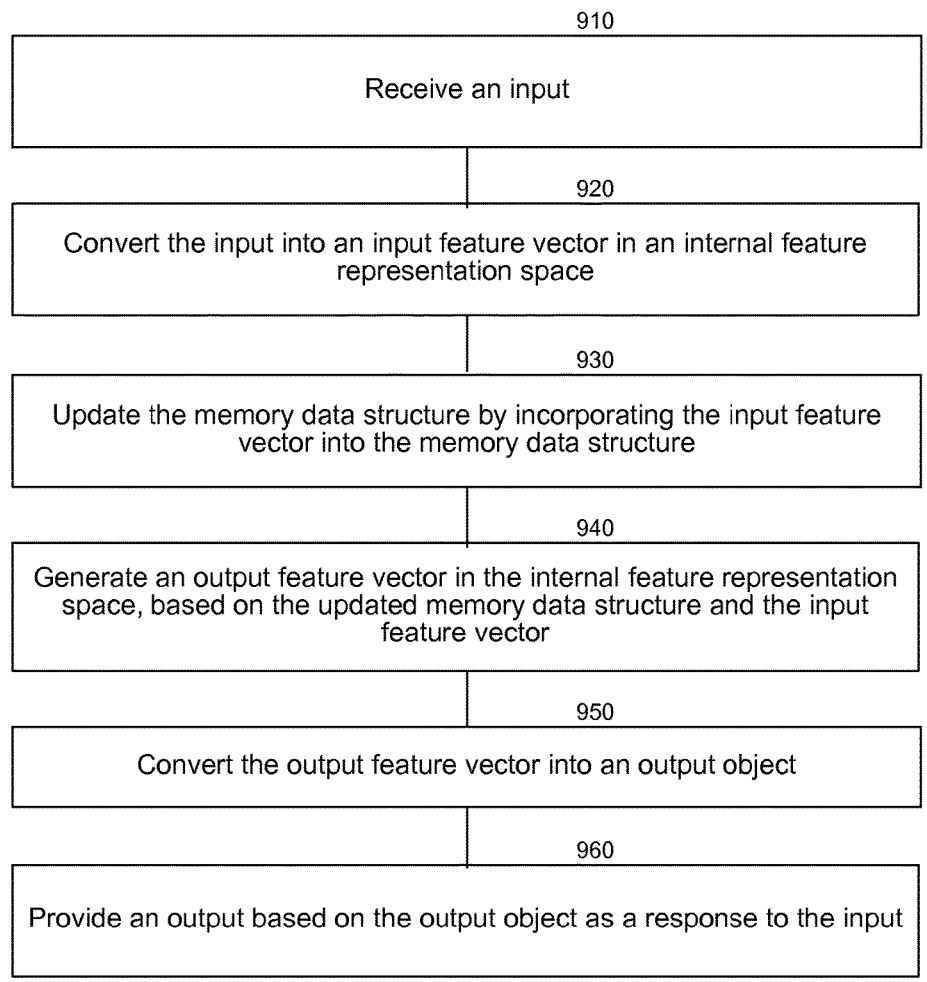
FIG. 9 is a block diagram illustrating a process of providing a machine-generated response to an input using a memory network.

FIG. 9 is a block diagram illustrating a process of providing a machine-generated response to an input using a memory network, consistent with various embodiments. The input or the response can include, e.g., a character, a word, a text, a sentence, an image, an audio, a video, a user interface instruction, a computer-generated action, etc. In various embodiments, the input and the response can be in a form of a question and an answer. The memory network can run, e.g., on a computing device such as a computer, a server or a mobile device. The memory network includes a memory data structure for storing relevant long-term memory information. An example of such long-term memory includes sentences of a background story. If the memory network receives a question that relates to the background story, the memory network can rely on the background story as the long-term memory to generate the answer.

In various embodiments, the memory data structure includes an array of memory objects. The objects can be, e.g., vectors or textual strings. At least some of the objects include information that is relevant to the question. The memory data structure can be organized as multiple memory slots. Each occupied memory slot stores a memory object of the array. The memory data structure can include additional empty memory slots for storing more incoming memory objects.

In order to control the size of the memory data structure, the memory network can use a "forgetting" functionality to optimize the size. The memory network monitors the utility status of the memory slots in the memory data structure. The utility status can indicate, e.g., a number of times that a memory object in a memory slot is selected as a supporting memory object that is relevant to input feature vectors for generating an output feature vector. Based on the utility status of the memory slots, the memory network can select a memory slot with a memory object that is selected the least number of times as a supporting memory object. To save space, the memory network can empty the selected memory slot or overwrite the selected memory slot with an incoming new memory object.

At block 910, the memory network receives an input. The input can include, e.g., a textual message presented as a question. At block 920, the memory network converts the input into an input feature vector in an internal feature representation space. In various embodiments, the memory network may convert the input using a mapping function. The mapping function has a dimension of features D. In other words, the internal feature space has a dimension of D. The internal feature space can be based on, e.g., a predetermined dictionary of words (also referred to as "a bag of words representation"). For example, the internal feature space can be determined as to have three representation features for each word of the predetermined dictionary. The dimension of features D=|W|, where W is the total number of words in the predetermined dictionary.

At block 930, the memory network updates the memory data structure by incorporating the input feature vector into the memory data structure. In various embodiments, the memory network can incorporate the input feature vector in various ways. For example, the memory network can simply store the input feature vector in the next empty memory slot of the memory data structure, without modifying memory slots that store existing memory information. Alternatively, a more sophisticated model can be used to modify the existing memory information in the memory slots based on the input feature vector.

At block 940, the memory network generates an output feature vector in the internal feature representation space, based on the updated memory data structure and the input feature vector. The memory network can generate the output feature vector by, e.g., finding supporting memory entries that are relevant to the input feature vector. For example, the memory network can identify one or more supporting memory entries in the memory data structure as being relevant to the input feature vector. Based on the identified support memory entries as well as the input feature vector, the memory network generates the output feature vector.

In various embodiments, the memory network can use a relevancy function to determine relevancy scores between the input feature vector and memory entries in the memory data structure. The parameters of the relevancy function are trained using a training data set including questions and answers. The memory network identifies the supporting memory entries based on the relevancy scores. In some embodiments, the memory network combines the supporting memory entries by, e.g., generating a vector sum of the supporting memory entries and the input feature vector.

The relevancy function can include a weight matrix (also referred to as an "embedding matrix"). The weight matrix can have a feature dimension determined based on a total number of words in a predetermined dictionary. The other dimension of the weight matrix is the embedding dimension (hence the name "embedding matrix"), which is consistent with the dimensions of the input feature vector and memory entry vectors in the memory slots.

The weight matrix includes matrix elements that are determined by a training process using the training data set that includes pairs of questions and known answers. The elements of the weight matrix can be trained using, e.g., a stochastic gradient descent process. During each step, the stochastic gradient descent process samples memory entries in the memory data structure that are not the supporting memory entries.

In various embodiments, the memory network can take into account modeling write time as well. For example, the indices of the memory objects of the array can follow a sequence consistent with write timestamps of the memory objects. Alternatively, the relevancy function can be a triples relevancy function taking the write time into account. The input of a triples relevancy function is the input feature vector and two memory objects from the memory data structure. The relevancy score of the triples relevancy function determines whether a first memory object is preferable over the second memory object or the second memory object is preferable over the first memory object. The memory network uses the triples relevancy functions to determine scores for the input feature vector and various duos of memory objects. The memory network selects a memory object that is preferable over a remainder of the memory objects of the array as a first supporting memory, based on the relevancy scores of the triples relevancy functions. The memory network can further select more supporting memories based on the scores. The memory network then generates the output feature vector based on the supporting memory or memories and the input feature vector.

At block 950, the memory network converts the output feature vector into an output object (e.g., an output textual message). The output object can include, e.g., a word or a sentence. In various embodiments, the memory network uses a second relevancy function to determine relevancy scores between the output feature vector and words in a predetermined dictionary. The memory network selects a word that has a highest relevancy score from the predetermined dictionary and generates an output textual message including the selected word.

The second relevancy function used at block 950 may have the same form as the relevancy function used at block 940. However, the parameters of the second relevancy function can be different from the previous relevancy function. In other words, the matrix elements of the second relevancy function can be different from the elements of the first relevancy function. Like the first relevancy function, the matrix elements of the second relevancy function can be trained by a training process using pairs of questions and known answers.

In some embodiments, the memory network can use a recurrent neural network to generate a sentence as the output textual message based on the output feature vector.

At block 960, the memory network provides an output based on the output object as a response to the input. For example, the response can be an answer responding to a question. The output can include, e.g., a character, a word, a sentence, a paragraph, a string, an image, an audio, a video, or a user interface instruction.

Figure 10:
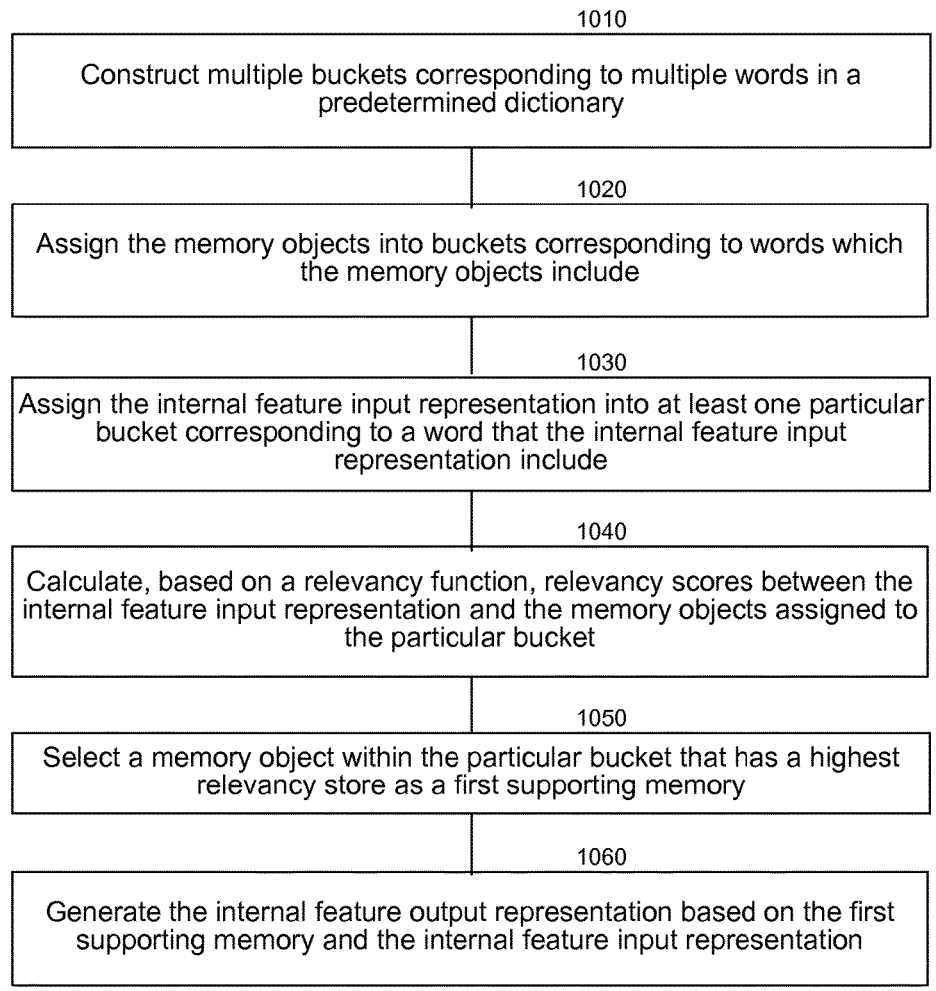
FIG. 10 is a block diagram illustrating a process of hashing memory entries into multiple buckets via word hashing.
Figure 11:
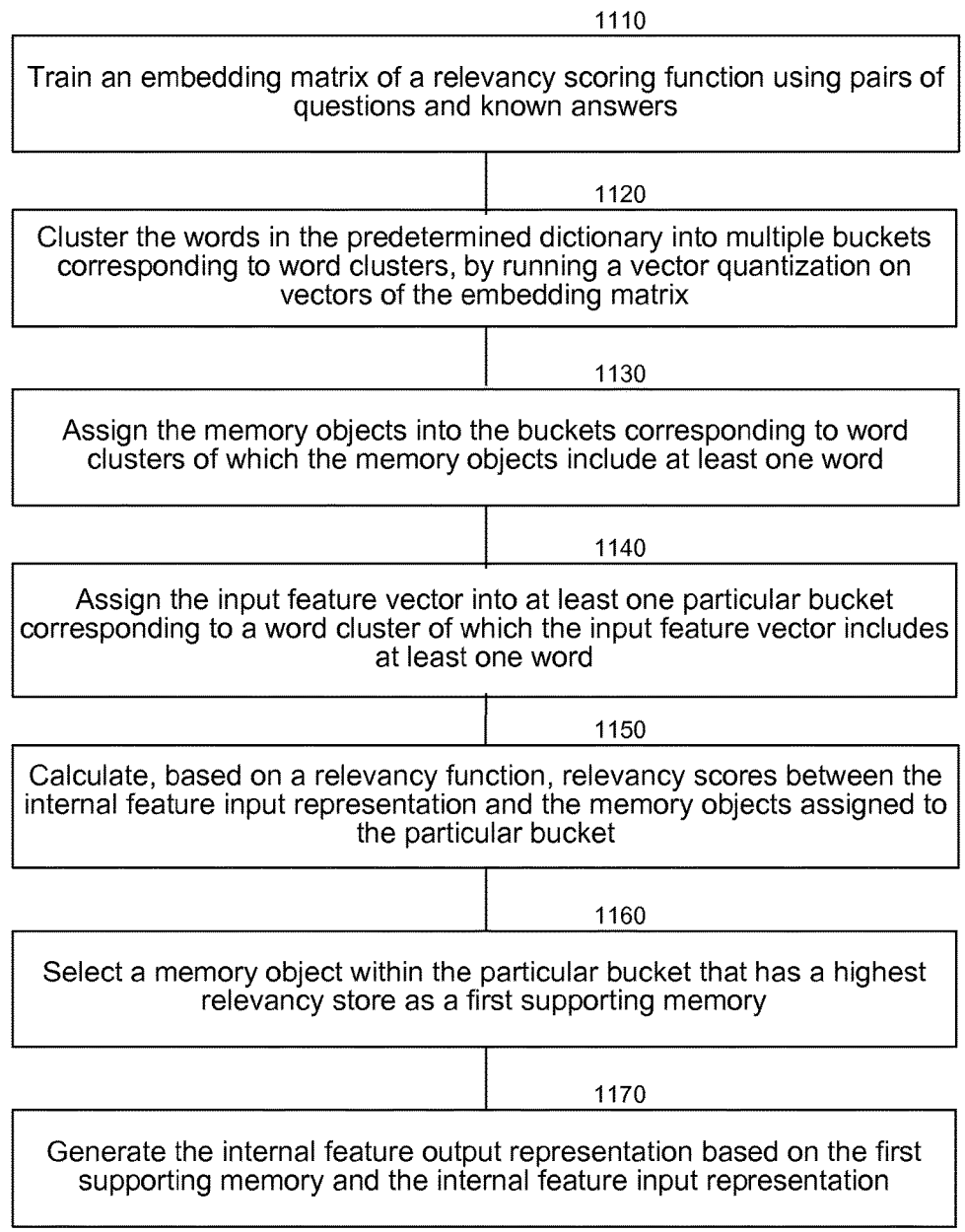
FIG. 11 is a block diagram illustrating another process of hashing memory entries into multiple buckets via clustering word embedding.

If the data size of the memory network is large, it may be prohibitive to calculate the relevancy scores between the input feature vector and all memory entries in the memory data structure at block 940. In order to improve the efficiency, the memory network may use a hashing method to break down the memory entries into multiple buckets and calculate the relevancy scores between the input feature vector and all memory entries in a relevant bucket. FIGS. 10 and 11 illustrate examples of hashing methods for memory entry bucket assignment.

FIG. 10 is a block diagram illustrating a process of hashing memory entries into multiple buckets via word hashing, consistent with various embodiments. At block 1010, the memory network can construct multiple buckets corresponding to multiple words in a predetermined dictionary. A bucket corresponding to a particular word is used to include memory objects relevant to the particular word. At block 1020, the memory network assigns the memory objects into buckets corresponding to words that the memory objects include.

At block 1030, the memory network assigns the internal feature input representation into at least one particular bucket corresponding to a word that the internal feature input representation includes. At block 1040, the memory network calculates, based on a relevancy function, relevancy scores between the internal feature input representation and the memory objects assigned to the particular bucket.

At block 1050, the memory network selects a memory object within the particular bucket that has a highest relevancy score as a first supporting memory. At block 1060, the memory network generates the internal feature output representation based on the first supporting memory and the internal feature input representation.

FIG. 11 is a block diagram illustrating another process of hashing memory entries into multiple buckets via clustering word embedding, consistent with various embodiments. At block 1110, the memory network trains an embedding matrix of a relevancy scoring function using pairs of questions and known answers. The embedding matrix has a dimension corresponding to a number of words in a predetermined dictionary. At block 1120, the memory network clusters the words in the predetermined dictionary into multiple buckets corresponding to word clusters, by running a vector quantization on vectors of the embedding matrix. At block 1130, the memory network assigns the memory objects into the buckets corresponding to word clusters of which the memory objects includes at least one word.

At block 1140, the memory network assigns the input feature vector into at least one particular bucket corresponding to a word cluster of which the input feature vector includes at least one word. At block 1150, the memory network calculates, based on a relevancy function, relevancy scores between the internal feature input representation and the memory objects assigned to the particular bucket.

At block 1160, the memory network selects a memory object within the particular bucket that has a highest relevancy score as a first supporting memory. At block 1170, the memory network generates the internal feature output representation based on the first supporting memory and the internal feature input representation.

Figure 12:
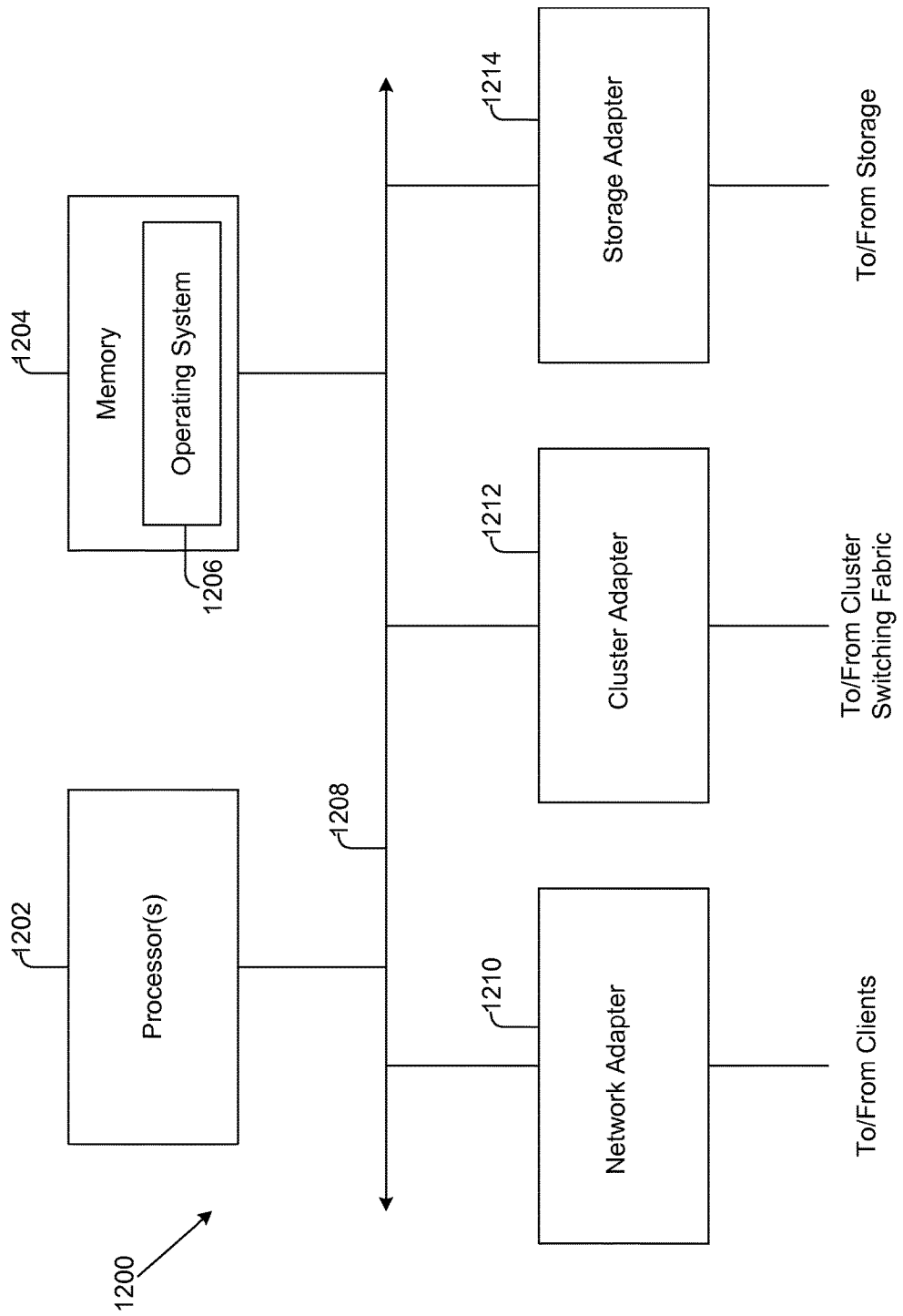
FIG. 12 is a high-level block diagram illustrating an example of a hardware architecture of a computing device that performs disclosed processes, in various embodiments.

FIG. 12 is a high-level block diagram illustrating an example of a hardware architecture of a computing device 1200 that performs the above process, consistent with various embodiments. The computing device 1200 executes some or all of the processor executable process steps that are described below in detail. In various embodiments, the computing device 1200 includes a processor subsystem that includes one or more processors 1202. Processor 1202 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1200 can further include a memory 1204, a network adapter 1210, a cluster access adapter 1212 and a storage adapter 1214, all interconnected by an interconnect 1208. Interconnect 1208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 1212 includes one or more ports adapted to couple the computing device 1200 to other devices. In the illustrated embodiment, Ethernet can be used as the clustering protocol and interconnect media, although other types of protocols and interconnects may be utilized within the cluster architecture described herein.

The computing device 1200 can be embodied as a single- or multi-processor system executing an operating system 1206 that can implement a high-level module, e.g., a manager, to logically organize the information as a hierarchical structure of named directories, files and special types of files called virtual disks at the storage devices. The computing device 1200 can further include graphical processing unit(s) for graphical processing tasks or processing non-graphical tasks in parallel.

The memory 1204 can comprise storage locations that are addressable by the processor(s) 1202 and adapters 1210, 1212, and 1214 for storing processor executable code and data structures. The processor 1202 and adapters 1210, 1212, and 1214 may, in turn, comprise processing elements and/or logic circuitry configured to execute the software code and manipulate the data structures. The operating system 1206, portions of which are typically resident in memory and executed by the processor(s) 1202, functionally organizes the computing device 1200 by (among other things) configuring the processor(s) 1202 to invoke. It will be apparent to those skilled in the art that other processing and memory implementations, including various computer readable storage media, may be used for storing and executing program instructions pertaining to the technology.

The network adapter 1210 can include multiple ports to couple the computing device 1200 to one or more clients over point-to-point links, wide area networks, virtual private networks implemented over a public network (e.g., the Internet) or a shared local area network. The network adapter 1210 thus can include the mechanical, electrical and signaling circuitry needed to connect the computing device 1200 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1214 can cooperate with the operating system 1206 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1214 can include multiple ports having input/output (I/O) interface circuitry that couples to the disks over an I/O interconnect arrangement, e.g., a conventional high-performance, Fibre Channel (FC) link topology. In various embodiments, the cluster adapter 1212 and the storage adapter 1214 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a machine-generated response to an input, comprising:
   receiving, by a computing device, an input;
   converting, by the computing device, the input into a first feature vector;
   updating, by the computing device, a memory data structure by incorporating the first feature vector into the memory data structure;
   generating, by the computing device, a second feature vector based on the updated memory data structure and the first feature vector;
   converting, by the computing device, the second feature vector into a content object with a recurrent neural network, wherein the second feature vector and one or more supporting memory slots are provided as inputs to the recurrent neural network, and wherein the content object is generated as an output by the recurrent neural network; and
   providing, by the computing device, an output based on the content object as a response to the input.

2. The method of claim 1, wherein the input includes a character, a word, a text, a sentence, an image, an audio, a video, a user interface instruction, a computer-generated action, or a question; and wherein the output includes a character, a word, a text, a sentence, an image, an audio, a video, a user interface instruction, a computer-generated action, or an answer to the question.

3. The method of claim 1, wherein the memory data structure includes an array of objects, and at least one of the objects includes information having a relevancy score higher than a predetermined score with respect to the input.

4. The method of claim 1, wherein the memory data structure includes an array of vectors or an array of textual strings, and at least one of the vectors or textual strings includes information having a relevancy score higher than a predetermined score with respect to the input.

5. The method of claim 1, wherein the memory data structure includes multiple memory slots, at least some of the memory slots storing vectors including information having a relevancy score higher than a predetermined score with respect to the input.

6. The method of claim 1, wherein the step of updating the memory data structure comprises:
   storing the first feature vector in a next available memory slot in the memory data structure.

7. The method of claim 1, wherein the step of generating the second feature vector comprises:
   identifying one or more supporting memory slots in the memory data structure as having one or more relevancy scores higher than a predetermined score with respect to the first feature vector; and
   generating the second feature vector based on the first feature vector and the identified supporting memory slots.

8. The method of claim 1, wherein the step of generating the second feature vector further comprises:
   using a first relevancy function to determine relevancy scores between the first feature vector and memory slots in the memory data structure; and
   selecting a first memory slot having a highest relevancy score as a first supporting memory slot.

9. The method of claim 8, wherein the step of generating the second feature vector further comprises:

using the first relevancy function to determine relevancy scores between a vector sum of the first feature vector and the first supporting memory slot and other memory slots in the memory data structure;
selecting a second memory slot having a highest relevancy score as a second supporting memory slot; and
generating the second feature vector based on a vector sum of the first feature vector and the first and second supporting memory slots.

10. The method of claim 8, wherein the first relevancy function includes a first weight matrix, and the first weight matrix includes elements that are determined by a training process using pairs of questions and known answers.

11. The method of claim 10, further comprising:
training the elements of the first weight matrix of the first relevancy function using a stochastic gradient descent process, wherein during each step, the stochastic gradient descent process samples memory slots in the memory data structure that are not the first or second supporting memory slot.

12. The method of claim 10, wherein the first weight matrix has a dimension determined based on a total number of words in a predetermined dictionary.

13. The method of claim 1, wherein the step of converting the second feature vector comprises:
using a second relevancy function to determine relevancy scores between a vector sum of the second feature vector and one or more supporting memory slots and words in a predetermined dictionary; and
generating a textual message including a selected word having a highest relevancy score from the predetermined dictionary.

14. The method of claim 13, wherein the second relevancy function includes a second weight matrix, and the second weight matrix includes elements that are determined by a training process using pairs of questions and known answers.

15. The method of claim 14, further comprising:
training the elements of the second weight matrix of the second relevancy function using a stochastic gradient descent process, wherein during each step, the stochastic gradient descent process samples words in the predetermined dictionary that are not the selected word having the highest relevancy score.

16. The method of claim 1, wherein the step of converting the second feature vector further comprises:
using the recurrent neural network to generate a sentence as the content object based on the second feature vector and the one or more supporting memory slots.

17. The method of claim 1, wherein updating the memory data structure comprises:
updating, by the computing device, an array of memory objects using the first feature vector, the memory objects including information having a relevancy score higher than a predetermined score with respect to the input.

18. The method of claim 17, further comprises:
monitoring utility status of the memory objects of the array, the utility status indicating numbers of times that the memory objects are selected as supporting memories for generating feature vectors;
selecting, based on the utility status, a memory object having a least number of times as a supporting memory for generating feature vectors; and
overwriting the selected memory object with new memory information.

19. The method of claim 17, wherein generating the second feature vector comprises:
computing, based on a relevancy function, relevancy scores between the first feature vector and the memory objects of the array, the relevancy function including parameters that are trained using pairs of questions and known answers;
selecting a memory object that has a highest relevancy score as a first supporting memory; and
generating the second feature vector based on the first supporting memory and the first feature vector.

20. The method of claim 17, wherein generating the second feature vector further comprises:
constructing multiple buckets corresponding to multiple words in a predetermined dictionary;
assigning the memory objects into buckets corresponding to words that the memory objects include;
assigning the first feature vector into at least one particular bucket corresponding to a word that the first feature vector includes;
computing, based on a relevancy function, relevancy scores between the first feature vector and the memory objects assigned to the particular bucket, the relevancy function including parameters that are trained using pairs of questions and known answers;
selecting a memory object within the particular bucket that has a highest relevancy score as a first supporting memory; and
generating the second feature vector based on the first supporting memory and the first feature vector.

21. The method of claim 17, wherein generating the second feature vector further comprises:
training an embedding matrix of a relevancy scoring function using pairs of questions and known answers, the embedding matrix having a dimension corresponding to a number of words in a predetermined dictionary;
clustering the words in the predetermined dictionary into multiple buckets corresponding to word clusters, by running a vector quantization on vectors of the embedding matrix;
assigning the memory objects into the buckets corresponding to word clusters of which the memory objects include at least one word;
assigning the first feature vector into at least one particular bucket corresponding to a word cluster of which the first feature vector includes at least one word;
computing, based on a relevancy function, relevancy scores between the first feature vector and the memory objects assigned to the particular bucket, the relevancy function including parameters that are trained using pairs of questions and known answers;
selecting a memory object within the particular bucket that has a highest relevancy score as a first supporting memory; and
generating the second feature vector based on the first supporting memory and the first feature vector.

22. The method of claim 17, wherein indices of the memory objects of the array follow a sequence consistent with write timestamps of the memory objects.

23. The method of claim 17, wherein generating the second feature vector further comprises:
computing, based on a triples relevancy function, a relevancy score between the first feature vector and a first memory object and a second memory object of the array, the relevancy score of the triples relevancy function determining whether the first memory object is preferable over the second memory object or the second memory object is preferable over the first memory object;

selecting a memory object that is preferable over a remainder of the memory objects of the array as a first supporting memory, based on the relevancy scores of the triples relevancy functions; and generating the second feature vector based on the first supporting memory and the first feature vector.

24. A computing system, comprising: one or more processors; and a memory coupled to the processors comprising instructions executable by the processors, the processors operable when executing the instructions to:

receive an input;

convert the input into a first feature vector;

update a memory data structure by incorporating the first feature vector into the memory data structure;

generate a second feature vector based on the first feature vector and the updated memory data structure;

convert the second feature vector into a content object with a recurrent neural network, wherein the second feature vector and one or more supporting memory slots are provided as inputs to the recurrent neural network, and wherein the content object is generated as an output by the recurrent neural network; and provide an output based on the content object as a response to the input.

25. The computing system of claim 24, wherein the processors are further operable when executing the instructions to store the first feature vector in a next available memory slot of the memory data structure, the memory data structure including multiple memory slots for storing memory objects.

26. The computing system of claim 24, wherein the processors are further operable when executing the instructions to:

determine, using a first relevancy function, relevancy scores between the first feature vector and memory objects in the memory data structure;

select a memory object having a highest relevancy score as a first supporting memory object; and generate the second feature vector by combining the input first feature vector and the first supporting memory object;

wherein the first relevancy function includes an embedding matrix, the embedding matrix including matrix elements that are determined by a training process using pairs of questions and known answers.

27. The computing system of claim 24, wherein the processors are further operable when executing the instructions to:

determine, using a second relevancy function, relevancy scores between the second feature vector and words in a predetermined dictionary; and generating a textual answer including a selected word having a highest relevancy score among the words in the predetermined dictionary.

28. The computing system of claim 24, wherein the processors are further operable when executing the instructions to:

cluster words in a predetermined dictionary into multiple buckets, by running a vector quantization on vectors of an embedding matrix;

assign the memory objects of the memory data structure into the buckets of which the memory objects include at least one word;

determine, using a first relevancy function, relevancy scores between the first feature vector and memory objects in a bucket of which the first feature vector includes at least one word;

select a memory object having a highest relevancy score as a first supporting memory object; and generate the second feature vector by combining the first feature vector and the first supporting memory object.

29. The computing system of claim 24, wherein the processors are further operable when executing the instructions to:

determine, based on a triples relevancy function, a relevancy score between the first feature vector and a first memory object and a second memory object in the memory data structure, the relevancy score of the triples relevancy function determining whether the first memory object is preferable over the second memory object or the second memory object is preferable over the first memory object;

selecting a memory object that is preferable over a remainder of the memory objects of the array as a first supporting memory, based on the relevancy scores of the triples relevancy functions; and generating the second feature vector based on the first supporting memory and the first feature vector.

30. One or more computer-readable non-transitory storage media embodying software that is operable when executed to:

receive an input;

convert the input into a first feature vector;

update a memory data structure by incorporating the first feature vector into the memory data structure;

generate a second feature vector based on the first feature vector and the updated memory data structure;

convert the second feature vector into a content object with a recurrent neural network, wherein the second feature vector and one or more supporting memory slots are provided as inputs to the recurrent neural network, and wherein the content object is generated as an output by the recurrent neural network; and provide an output based on the content object as a response to the input.

* * * * *